(12) United States Patent
Matsumura et al.

(10) Patent No.: US 10,000,634 B2
(45) Date of Patent: Jun. 19, 2018

(54) RESIN COMPOSITION FOR MOLDING USE

(71) Applicants: SEKISUI CHEMICAL CO., LTD., Osaka (JP); TOKUYAMA SEKISUI CO., LTD., Osaka (JP)

(72) Inventors: Kenichi Matsumura, Yamaguchi (JP); Atsushi Seiki, Yamaguchi (JP); Norikazu Mashino, Yamaguchi (JP); Atsushi Kawano, Yamaguchi (JP); Kei Yoshiyama, Yamaguchi (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 0 days. days.

(21) Appl. No.: 15/316,285

(22) PCT Filed: Jul. 23, 2015

(86) PCT No.: PCT/JP2015/071036
§ 371 (c)(1),
(2) Date: Dec. 5, 2016

(87) PCT Pub. No.: WO2016/013638
PCT Pub. Date: Jan. 28, 2016

(65) Prior Publication Data
US 2017/0183491 A1 Jun. 29, 2017

(30) Foreign Application Priority Data
Jul. 24, 2014 (JP) ................ 2014-151232

(51) Int. Cl.
- C08K 5/09 (2006.01)
- C08L 27/24 (2006.01)
- C08K 5/098 (2006.01)
- C08K 5/134 (2006.01)
- F16L 9/127 (2006.01)

(52) U.S. Cl.
CPC .............. *C08L 27/24* (2013.01); *C08K 5/098* (2013.01); *C08K 5/1345* (2013.01); *F16L 9/127* (2013.01); *C08K 2201/014* (2013.01); *C08K 2201/019* (2013.01); *C08L 2201/08* (2013.01); *C08L 2203/18* (2013.01)

(58) Field of Classification Search
CPC .. C08L 27/24; C08L 2201/08; C08L 2203/18; C08K 5/098; C08K 5/1345; C08K 2201/019; C08K 2201/014; F16L 9/127
USPC ........................................ 524/400
See application file for complete search history.

(56) References Cited

U.S. PATENT DOCUMENTS

| | | | | |
|---|---|---|---|---|
| 5,143,959 A | * | 9/1992 | Carette | C08K 3/26 252/400.3 |
| 2009/0030123 A1 | | 1/2009 | Zhou | |
| 2014/0336321 A1 | | 11/2014 | Yamasugi et al. | |
| 2016/0200893 A1 | | 7/2016 | Matsumura et al. | |
| 2016/0208072 A1 | | 7/2016 | Matsumura et al. | |

FOREIGN PATENT DOCUMENTS

| | | |
|---|---|---|
| JP | 6-287388 | 10/1994 |
| JP | 2002-138179 | 5/2002 |
| JP | 2005-28756 | 2/2005 |
| JP | 2006-328166 | 12/2006 |
| JP | 2006328166 A * | 12/2006 |
| JP | 2008-214466 | 9/2008 |
| JP | 2008-535997 | 9/2008 |
| WO | 2013/080563 | 6/2013 |
| WO | 2015/046454 | 4/2015 |
| WO | 2015/046456 | 4/2015 |

OTHER PUBLICATIONS

International Search Report dated Aug. 25, 2015 in corresponding International Application No. PCT/JP2015/071036.
Extended European Search Report dated Feb. 1, 2018 in corresponding European Application No. 15824766.8.

\* cited by examiner

*Primary Examiner* — Hui Chin
(74) *Attorney, Agent, or Firm* — Wenderoth, Lind & Ponack, L.L.P.

(57) ABSTRACT

The present invention provides a resin composition for molding, including a chlorinated polyvinyl chloride and a thermal stabilizer, the chlorinated polyvinyl chloride having structural units (a) to (c) represented by formulae (a) to (c) shown below:

$$—CCl_2— \quad (a),$$
$$—CHCl— \quad (b),$$
$$—CH_2— \quad (c),$$

the proportion of the structural unit (a) being 17.5 mol % or less, the proportion of the structural unit (b) being 46.0 mol % or more, and the proportion of the structural unit (c) being 37.0 mol % or less, relative to the total number of moles of the structural units (a), (b), and (c), the chlorinated polyvinyl chloride having a chlorine content of 63 mass % or more and less than 72 mass %, the thermal stabilizer containing a calcium alkyl carboxylate and a zinc compound, and the resin composition for molding having a loss in quantity on heating at 230° C. of less than 2 mass %.

12 Claims, No Drawings

RESIN COMPOSITION FOR MOLDING USE

TECHNICAL FIELD

The present invention relates to a resin composition for molding that allows production of a molded body having excellent thermal stability as well as high flexibility and strength, without using heavy metals such as lead and tin, and also relates to a molded body obtained using the resin composition for molding.

BACKGROUND ART

A polyvinyl chloride composition is widely used as the material of resin molded bodies for building materials, for example. The polyvinyl chloride composition may be processed at high temperatures, and is therefore required to have high thermal stability. The polyvinyl chloride composition also needs to have high thermal stability to provide thermal stability for molded bodies. Further, color tone is an important consideration for resin molded bodies used as building materials, and therefore, the polyvinyl chloride composition also needs to have coloration resistance.

To meet these demands, a thermal stabilizer is generally added to a polyvinyl chloride prior to melt molding, in order to improve various kinds of performance such as thermal stability and coloration resistance.

Conventionally, a thermal stabilizer containing a heavy metal such as lead, cadmium, or barium has been used as the thermal stabilizer. However, as such heavy metals have toxicity and give adverse effects on the environment, thermal stabilizers and resin molded products free from a metal with high toxicity such as lead have been proposed.

Patent Literature 1, for example, discloses a stabilized halogen-containing resin composition containing a halogen-containing resin, and a composite of acid clay and/or activated clay and a calcium hydroxide-based compound represented by the formula: $Ca_{1-x-y}M^{2+}{}_xAl_y(OH)_2$, where $M^{2+}$ represents a bivalent metal such as Mg, Zn, or Cu; and x and y are $0 \leq x < 0.4$ and $0 \leq y < 0.1$, respectively.

In recent years, with an increasingly growing interest for environmental protection and preservation, there is an increasing demand for a thermal stabilizer and a resin molded body free from even a heavy metal lower in toxicity than lead, such as tin. On the other hand, Patent Literature 2, for example, discloses a stabilizer composition containing a nitrogen-containing organic cyclic compound.

Even with use of this stabilizer composition, however, molded products unfortunately tend to be colored, and thus, the addition of a large amount of an expensive pigment or titanium oxide is required to prevent coloration.

Further improvement in performance has been desired for such resin compositions for molding that include such a heavy metal-free thermal stabilizer, as well as molded bodies.

CITATION LIST

Patent Literature

Patent Literature 1: JP 2008-214466 A
Patent Literature 2: JP 2008-535997 T

SUMMARY OF INVENTION

Technical Problem

The present invention aims to provide a resin composition for molding that allows production of a molded body having excellent thermal stability as well as high flexibility and strength, without using heavy metals such as lead and tin, and provide a molded body obtained using the resin composition for molding.

Solution to Problem

The present invention provides a resin composition for molding including a chlorinated polyvinyl chloride and a thermal stabilizer, the chlorinated polyvinyl chloride having structural units (a) to (c) represented by formulae (a) to (c) shown below, the proportion of the structural unit (a) being 17.5 mol % or less, the proportion of the structural unit (b) being 46.0 mol % or more, and the proportion of the structural unit (c) being 37.0 mol % or less, relative to the total number of moles of the structural units (a), (b), and (c), the chlorinated polyvinyl chloride having a chlorine content of 63 mass % or more and less than 72 mass %, the thermal stabilizer containing a calcium alkyl carboxylate and a zinc compound, and the resin composition for molding having a loss in quantity on heating at 230° C. of less than 2 mass %.

The present invention will be hereinafter described in detail.

As a result of extensive research, the present inventors found that when predetermined compounds and/or compounds having predetermined physical properties are used for a chlorinated polyvinyl chloride and a thermal stabilizer used in a resin composition for molding, a molded body having excellent thermal stability, prevented from coloration, and having high flexibility and strength can be produced without using heavy metals such as lead and tin, thus completing the present invention.

The resin composition for molding of the present invention has a loss in quantity on heating at 230° C. of less than 2 mass %.

When the loss in quantity on heating at 230° C. is 2 mass % or more, bubbles may be included inside the molded product to result in poor strength, or a streak-like pattern may be formed near the surface of the molded product to result in a defective external appearance.

The loss in quantity on heating at 230° C. is more preferably less than 1.0 mass %.

The lower limit thereof is not particularly limited, but is preferably 0.1 mass %.

Note that the loss in quantity on heating at 230° C. can be measured using a thermogravimetric measurement (TG) apparatus.

In accordance with the present invention, a heavy metal-free resin composition for molding can be obtained.

As used herein, the term "heavy metal" refers to a metal with a high density, and generally, a metal with a density of 4 to 5 $g/cm^3$ or more. The term "heavy metal-free" means that the heavy metal content is 1000 ppm or less. The heavy metal content is preferably 100 ppm or less.

Examples of such heavy metals include transition metals other than scandium, for example, Mn, Ni, Fe, Cr, Co, Cu, and Au. Such heavy metals also include metals of p-block elements in period 4 or less (e.g., Sn, Pb, and Bi), Cd, and Hg.

The resin composition for molding of the present invention contains a chlorinated polyvinyl chloride (hereinafter also referred to as a "CPVC") and a thermal stabilizer.

The CPVC has structural units (a) to (c) represented by the formulae (a) to (c) shown above. The proportion of the structural unit (a) is 17.5 mol % or less, the proportion of the structural unit (b) is 46.0 mol % or more, and the proportion of the structural unit (c) is 37.0 mol % or less, relative to the total number of moles of the structural units (a), (b), and (c). The CPVC as described above has high thermal stability and satisfactory molding processability.

The molar ratios of the structural units (a), (b), and (c) in the CPVC reflect the site to which chlorine is introduced at the time of chlorination of the polyvinyl chloride (PVC). Ideally, the PVC prior to chlorination is substantially in a state where the proportion of the structural unit (a) is 0 mol %, the proportion of the structural unit (b) is 50.0 mol %, and the proportion of the structural unit (C) is 50.0 mol %. As chlorination proceeds, however, the proportion of the structural unit (c) decreases, while the proportions of the structural unit (b) and the structural unit (a) increase. At this time, nonuniformity of the chlorinated state will increase in a case where the proportion of the structural unit (a), which is unstable with a large steric hindrance, excessively increases, or in a case where the chlorinated site and the unchlorinated site are unevenly present within the same particle of the CPVC. When this nonuniformity increases, the thermal stability of the CPVC will be greatly impaired.

On the other hand, in the present invention, the molar ratios of the structural units (a), (b), and (c) in the above-described CPVC are set within the above-defined range, such that the CPVC has improved uniformity and satisfactory thermal stability.

In the present invention, the proportion of the structural unit (a) relative to the total number of moles of structural units (a), (b), and (c) is 17.5 mol % or less, preferably 16.0 mol % or less, and preferably 2.0 mol % or more.

The proportion of the structural unit (b) relative to the total number of moles of structural units (a), (b), and (c) is 46.0 mol % or more, preferably 53.5 mol % or more, and preferably 70 mol % or less.

The proportion of the structural unit (c) relative to the total number of moles of structural units (a), (b), and (c) is 37.0 mol % or less, preferably 30.5 mol % or less, and preferably 1.0 mol % or more.

In the present invention, it is particularly preferred that the proportion of the structural unit (b) be 58.0 mol % or more, and the proportion of the structural unit (c) be 35.8 mol % or less. With this structure, higher thermal stability can be achieved.

The molar ratios of the structural units (a), (b), and (c) in the CPVC can be measured through molecular structure analysis using NMR. NMR analysis can be performed in accordance with the method described in R. A. Komoroski, R. G. Parker, J. P. Shocker, Macromolecules, 1985, 18, 1257-1265.

A PVC portion not chlorinated in the molecular structure of the CPVC can be represented by a structural unit (d) shown in formula (d) below. This portion is herein referred to as a "VC unit".

In the CPVC used in the present invention, the amount of a sequence of four or more VC units in the molecular structure is preferably 30.0 mol % or less. As used herein, the "sequence of four or more VC units" means a portion consisting of four or more VC units joined in series.

—CH$_2$—CHCl—          (d)

A VC unit present in the CPVC is a starting point of dehydrochlorination, and the presence of continuous VC units tends to cause a continuous dehydrochlorination reaction, which is called the "zipper reaction". That is, the greater is the number of a sequence of four or more VC units, the more readily dehydrochlorination will occur, which reduces thermal stability in the CPVC. Therefore, the proportion of a sequence of four or more VC units is preferably 30.0 mol % or less, more preferably 28.0 mol % or less. When the chlorine content in the CPVC is 69 mass % or more and less than 72 mass %, the proportion of a sequence of four or more VC units is preferably 18.0 mol % or less, more preferably 16.0 mol % or less.

The amount of a sequence of four or more vinyl chloride units in the molecular structure described above can be measured through molecular structure analysis using NMR described above.

The above-described CPVC has a chlorine content of 63 to 72 mass %.

When the chlorine content is less than 63 mass %, heat resistance will be insufficient in the molded product, and if the chlorine content exceeds 72 mass %, moldability will be significantly lowered.

The chlorine content is preferably 66 mass % or more, and preferably 69 mass % or less.

The chlorine content in the CPVC can be measured in accordance with the method described in JIS K 7229.

The CPVC preferably has a UV absorbance at a wavelength of 216 nm of 8.0 or less, more preferably 0.8 or less.

In an ultraviolet absorption spectrum, a wavelength of 216 nm is the wavelength at which —CH═CH—C(═O)— and —CH═CH—CH═CH—, which are heterogeneous structures in the CPVC, show absorption.

From the value of the UV absorbance of the CPVC, the heterogeneous structures in the molecular chain during the chlorination reaction can be quantified and thus used as an index of thermal stability. In the molecular structure of the CPVC, a chlorine atom attached to carbon adjacent to double-bonded carbon is unstable. Thus, dehydrochlorination occurs from this chlorine atom as the starting point. That is, the greater is the value of UV absorbance at the wavelength of 216 nm, the more readily dehydrochlorination will occur, which results in reduced thermal stability.

In particular, when the chlorine content in the CPVC is 63 mass % or more and less than 69 mass %, the value of the UV absorbance is preferably 0.8 or less. If the value of the UV absorbance exceeds 0.8, the influence of the heterogeneous structures in the molecular chain will be significant, and as a result, thermal stability may decrease.

When the chlorine content in the CPVC is 69 mass % or more and 72 mass % or less, the value of the UV absorbance is preferably 8.0 or less. When the value of the UV absorbance exceeds 8.0, the influence of the heterogeneous structures in the molecular chain will be significant, and thermal stability will decrease.

In the CPVC, time required for the amount of dehydrochlorination at 190° C. to reach 7000 ppm is preferably 60 seconds or longer, more preferably 100 seconds or longer.

The CPVC undergoes pyrolysis at high temperatures, and produces HCl gas during pyrolysis. Generally, as the degree of chlorination of the CPVC increases, the number of the above-described VC units decreases, and thus, the amount of dehydrochlorination tends to decrease. As the degree of chlorination increases, however, a nonuniform chlorinated state or the amount of the heterogeneous structures increases, which reduces thermal stability. Thus, an increase in the nonuniform chlorinated state or the amount of the heterogeneous structures can be analyzed by measuring the amount of dehydrochlorination. For example, the time required for the amount of dehydrochlorination at 190° C. to reach 7000 ppm can be used as an index of thermal stability. The shorter is the time, the lower will be the thermal stability.

In particular, when the chlorine content in the CPVC is 63 mass % or more and less than 69 mass %, the time required for the amount of dehydrochlorination at 190° C. to reach 7000 ppm is preferably 60 seconds or longer. When the time is shorter than 60 seconds, thermal stability will be greatly impaired. Thus, the time is preferably 60 seconds or longer, more preferably 70 seconds or longer, still more preferably 80 seconds or longer.

When the chlorine content in the CPVC is 69 mass % or more and 72 mass % or less, the time is preferably 100 seconds or longer. When the time is shorter than 100 seconds, thermal stability will greatly decrease. The time is therefore preferably 100 seconds or longer, more preferably 120 seconds or longer, still more preferably 140 seconds or longer.

The time required for the amount of dehydrochlorination at 190° C. to reach 7000 ppm can be measured as follows. Initially, 1 g of the chlorinated polyvinyl chloride is placed in a test tube and heated at 190° C. in an oil bath. The produced HCl gas is then collected. The collected HCl gas is dissolved in 100 ml of ion-exchange water, and the pH is measured. The HCl concentration (ppm) (that is, the number of grams of HCl produced per million grams of the chlorinated polyvinyl chloride) is calculated based on the pH value. The time required for the HCl concentration to reach 7000 ppm is then measured.

The CPVC is a resin obtained by the chlorination of a polyvinyl chloride (PVC).

As the PVC, a vinyl chloride homopolymer, a copolymer of a vinyl chloride monomer and a monomer with unsaturated bond(s) that is copolymerizable with the vinyl chloride monomer, a graft copolymer obtained by graft copolymerization of a vinyl chloride monomer with a polymer, and the like can be used. These polymers may be used singly or in combinations of two or more.

Examples of the monomer with unsaturated bond(s) that is copolymerizable with the vinyl chloride monomer include α-olefins such as ethylene, propylene, and butylene; vinyl esters such as vinyl acetate and vinyl propionate; vinyl ethers such as butyl vinyl ether and cetyl vinyl ether; (meth)acrylates such as methyl (meth)acrylate, ethyl (meth) acrylate, butyl acrylate, and phenyl methacrylate; aromatic vinyls such as styrene and α-methyl styrene; vinyl halides such as vinylidene chloride and vinylidene fluoride; and N-substituted maleimides such as N-phenyl maleimide and N-cyclohexyl maleimide. These monomers may be used singly or in combinations of two or more.

The polymer to which vinyl chloride is graft copolymerized is not particularly limited as long as vinyl chloride can be graft copolymerized. Examples of the polymer include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, ethylene-propylene copolymers, acrylonitrile-butadiene copolymers, polyurethane, chlorinated polyethylene, and chlorinated polypropylene. These polymers may be used singly or in combinations of two or more.

While the average degree of polymerization of the PVC is not particularly limited, it is preferably 400 to 3,000, as commonly employed, more preferably 600 to 1,500. The average degree of polymerization can be measured using the method described in JIS K 6720-2: 1999.

The method of polymerizing the PVC is not particularly limited, and a conventionally known method such as aqueous suspension polymerization, block polymerization, solution polymerization, or emulsion polymerization can be used.

In the present invention, the thermal stabilizer contains a calcium alkyl carboxylate and a zinc compound. The thermal stabilizer contains no heavy metal, and thus, a heavy-metal free composition for molding can be obtained.

The thermal stabilizer contains a calcium alkyl carboxylate and a zinc compound.

When this thermal stabilizer is used, hydrochloric acid produced by the pyrolysis of the chlorinated polyvinyl chloride immediately reacts with the zinc compound to form zinc chloride. Further, the growth of polyenes produced by the elimination of hydrochloric acid from the chlorinated polyvinyl chloride is stopped through bonding with the calcium alkyl carboxylate. As a result, coloring is suppressed.

On the other hand, the produced zinc chloride, which has the property of accelerating the pyrolysis of the chlorinated polyvinyl chloride, reacts with the calcium alkyl carboxylate to produce calcium chloride and a zinc alkyl carboxylate in the present invention. As a result, the thermal stabilizer has a significant synergistic effect in that it suppresses the pyrolysis-accelerating effect of zinc chloride, while utilizing the effect of the zinc compound of rapidly capturing hydrochloric acid.

Examples of the calcium alkyl carboxylates include calcium salts of pentanoic acid, hexanoic acid, heptanoic acid, octanoic acid, cyclohexylpropionic acid, nonanoic acid, decanoic acid, lauric acid, myristic acid, palmitic acid, stearic acid, 12-hydroxystearic acid, arachidic acid, behenic acid, lignoceric acid, and montanic acid.

Among the above, a calcium alkyl carboxylate with 8 to 28 carbon atoms is preferably used.

Examples of the zinc compounds include inorganic zinc compounds and organozinc compounds.

Examples of the inorganic zinc compounds include compounds including a carbonate, a chloride, a sulfate, an oxide, a hydroxide, a basic oxide, and a mixed oxide of zinc.

Examples of the organozinc compounds include alkyl zinc compounds such as di- and/or mono-alkyl zinc, zinc salts of organic aliphatic carboxylic acids, zinc salts of unsubstituted or substituted organic aromatic carboxylic acids, zinc organic phosphites, zinc salts of substituted or unsubstituted phenols, zinc salts of amino acids and derivatives thereof, and zinc salts of organic mercaptans.

Examples of organic aliphatic carboxylic acids forming the zinc salts of organic aliphatic carboxylic acids include montanic acid, rice bran fatty acids, behenic acid, erucic acid, stearic acid, oleic acid, linolic acid, rice fatty acids, ricinoleic acid, myristic acid, palmitic acid, lauric acid, lower fatty acids, octylic acid, isostearic acid, dimer acids, naphthenic acid, acetic acid, azelaic acid and monoesters thereof, sebacic acid and monoesters thereof, adipic acid and monoesters thereof, succinic acid and monoesters thereof, malonic acid and monoesters thereof, maleic acid and monoesters thereof, crotonic acid and monoesters thereof, malic acid and monoesters thereof, tartaric acid and monoesters thereof, citric acid and monoesters or diesters thereof, lactic acid, glycolic acid, thiodipropionic acid and monoesters thereof.

Examples of unsubstituted or substituted aromatic carboxylic acids forming the zinc salts of unsubstituted or substituted organic aromatic carboxylic acids include benzoic acid, o-, m- and p-toluylic acid, p-tert-butyl benzoic acid, p-hydroxybenzoic acid, salicylic acid, polybasic acids such as phthalic acid, meta-phthalic acid, terephthalic acid, and trimellitic acid, as well as monoesters or diesters thereof.

Examples of organic phosphites forming the zinc organic phosphites include acid phosphites, which are reaction products of fatty alcohols and phosphorus pentoxide. Specific examples of acid phosphites include butyl acid phosphite, octyl acid phosphite, stearyl acid phosphite, and behenyl acid phosphite.

Examples of substituted or unsubstituted phenols forming the zinc salts of substituted or unsubstituted phenols include phenols, cresols, xylol, octylphenol, nonylphenol, dinonylphenol, cyclohexylphenol, phenylphenol, bisphenol A, bisphenol S, bisphenol F, esters of p-hydroxybenzoic acid, and esters of salicylic acid.

Examples of the amino acids and derivatives thereof include baked glutamic acid, glycine, and alanine.

Examples of organic mercaptans forming the zinc salts of organic mercaptans include lauryl mercaptan, thioglycolic acid and esters thereof, mercaptopropionic acid and esters thereof, thiomalic acid and monoesters or diesters thereof.

The thermal stabilizer, which contains a calcium alkyl carboxylate and a zinc compound, is preferably a mixture of the calcium alkyl carboxylate and the zinc compound described above.

The thermal stabilizer may be in the form of a powder or granular material, for example. The thermal stabilizer made into such a form can be used as a single-pack thermal stabilizer.

When the thermal stabilizer is in the form of a particulate material, the particle size can be adjusted as appropriate, depending on the purpose. Generally, the average particle size is preferably 50 µm to 5 mm, particularly preferably 70 µm to 2 mm.

The thermal stabilizer in the form of the granular material can be produced using a known granulation method, for example, extrusion granulation, spray granulation, rotating disk granulation, rolling granulation, or compression granulation.

The thermal stabilizer preferably has a loss in quantity on heating at 230° C. of less than 5 mass %.

When the loss in quantity on heating at 230° C. is 5 mass % or more, bubbles may be included inside the molded product to result in poor strength, or a streak-like pattern may be formed near the surface of the molded product to result in a defective external appearance.

The loss in quantity on heating at 230° C. is more preferably less than 3 mass %.

The lower limit thereof is not particularly limited, but is preferably 0.1 mass %.

Note that the loss in quantity on heating at 230° C. can be measured using a thermogravimetric measurement (TG) apparatus.

The thermal stabilizer, which contains a calcium alkyl carboxylate and a zinc compound, preferably has a mixture ratio of the calcium alkyl carboxylate and the zinc compound (calcium alkyl carboxylate:zinc compound) of 9:1 to 4:6. The mixture ratio is more preferably 8:2 to 5:5.

The resin composition for molding of the present invention preferably contains the thermal stabilizer in an amount of 0.4 to 10 parts by mass, more preferably 0.6 to 7 parts by mass, based on 100 parts by mass of the chlorinated polyvinyl chloride. When the thermal stabilizer is contained in this range, thermal stability can be further improved, and a satisfactory external appearance of the molded body can be maintained.

The resin composition for molding of the present invention preferably also contains an antioxidant.

Examples of the antioxidants include phenolic antioxidants, phosphate-based antioxidants, sulfur-based antioxidants, and amine-based antioxidants. These antioxidants may be used singly or in combinations of two or more. Among the above, a phenolic antioxidant is preferred, and in particular, a hindered phenolic antioxidant is preferred.

Examples of the hindered phenolic antioxidants include 2,6-di-t-butyl-p-cresol, 2,6-diphenyl-4-octadecyloxyphenol, stearyl (3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis(4-ethyl-6-t-butylphenol), bis[3,3-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl] isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5] undecane, and bis[β-(3-t-butyl-4-hydroxy-5-methylphenyl) propionate]. Among the above, 1,3,5-tris(3,5-di-t-butyl-4-hydroxybenzyl) isocyanurate, pentaerythrityl-tetrakis [methylene-3-(3,5-di-t-butyl-4-hydroxyphenyl)propionate], and the like are preferred. These hindered phenolic antioxidants can be used singly or in combinations of two or more.

The antioxidant preferably has a loss in quantity on heating at 200° C. of less than 5 mass %.

When the loss in quantity on heating at 200° C. is 5 mass % or more, bubbles may be included inside the molded product to result in poor strength, or a streak-like pattern may be formed near the surface of the molded product to result in a defective external appearance.

The loss in quantity on heating at 200° C. is preferably less than 3 mass %.

The resin composition for molding of the present invention preferably contains the antioxidant in an amount of 0.1 to 3 parts by mass, more preferably 0.2 to 2.5 parts by mass, based on 100 parts by mass of the chlorinated polyvinyl chloride. When the antioxidant is contained in this range, a molded product with little coloration due to yellowing can be obtained.

The resin composition for molding of the present invention preferably also contains an auxiliary stabilizer. When the auxiliary stabilizer is contained, thermal stability can be further improved.

A heavy metal-free auxiliary stabilizer can be used as the auxiliary stabilizer. Examples of such auxiliary stabilizers include organic acid salts, epoxy compounds such as epoxidized soybean oil, epoxidized linseed oil, epoxidized tetrahydrophthalate, epoxidized polybutadiene, organic phosphorous compounds, phosphites, phosphates, metal hydroxides such as calcium hydroxide, sodium hydroxide, sodium adipate, bisphenol A-type epoxy compounds, glycidyl (meth)acrylate copolymers, oxetanyl compounds, vinyl ether compounds, and zeolite compounds. These auxiliary stabilizers may be used singly or in combinations of two or more. Note that the auxiliary stabilizer differs from the calcium alkyl carboxylate and the zinc compound.

Further, the thermal stabilizer preferably has a loss in quantity on heating at 200° C. of less than 5 mass %.

The resin composition for molding of the present invention may be optionally mixed with additives such as lubricants, processing aids, impact modifiers, heat resistance improvers, ultraviolet absorbents, light stabilizers, fillers, thermoplastic elastomers, and pigments.

Examples of the lubricants include internal lubricants and external lubricants. An internal lubricant is used to reduce the fluid viscosity of the molten resin during molding to prevent the generation of frictional heat. Examples of the internal lubricants include, but are not particularly limited to, butyl stearate, lauryl alcohol, stearyl alcohol, glycerol monostearate, stearic acid, and bisamide. These internal lubricants may be used singly or in combinations of two or more.

The lubricant preferably has a loss in quantity on heating at 200° C. of less than 5 mass %.

The external lubricant is used to improve the slip effect between metal surfaces and the molten resin during molding. Examples of the external lubricants include, but are not particularly limited to, paraffin wax, polyolefin waxes such as polyethylene-based lubricants, ester waxes such as fatty acid ester-based lubricants, and montanic acid wax. These external lubricants may be used singly or in combinations of two or more.

Examples of the processing aids include, but are not particularly limited to, acrylic processing aids such as alkyl acrylate-alkyl methacrylate copolymers having a mass average molecular weight of 100,000 to 2,000,000. Examples of the acrylic processing aids include, but are not particularly limited to, n-butyl acrylate-methyl methacrylate copolymers and 2-ethylhexyl acrylate-methyl methacrylate-butyl methacrylate copolymers. These processing aids may be used singly or in combinations of two or more. The processing aid preferably has a loss in quantity on heating at 200° C. of less than 5 mass %.

Examples of the impact modifiers include, but are not particularly limited to, methyl methacrylate-butadiene-styrene copolymers (MBS), chlorinated polyethylene, and acrylic rubber.

Examples of the heat resistance improvers include, but are not particularly limited to, α-methylstyrene-based resins and N-phenyl maleimide-based resins.

Examples of the light stabilizers include, but are not particularly limited to, hindered amine-based light stabilizers.

Examples of the ultraviolet absorbents include, but are not particularly limited to, salicylate-based, benzophenone-based, benzotriazole-based, and cyanoacrylate-based ultraviolet absorbents.

Examples of the pigments include, but are not particularly limited to, organic pigments such as azo-based pigments, phthalocyanine-based pigments, threne-based pigments, and dye lake-based pigments; and inorganic pigments such as titanium dioxide and other oxide-based pigments, sulfide/selenide-based pigments, and ferrocyanide-based pigments.

A plasticizer may be added to the resin composition for molding of the present invention to improve processability during molding. The use of a large amount of plasticizer, however, is not so desirable because it may reduce the thermal stability of the molded body. Examples of the plasticizers include, but are not particularly limited to, dibutyl phthalate, di-2-ethylhexyl phthalate, and di-2-ethylhexyl adipate.

A thermoplastic elastomer may be added to the resin composition for molding of the present invention to improve workability. Examples of the thermoplastic elastomers include, but are not particularly limited to, acrylonitrile-butadiene copolymers (NBR), ethylene-vinyl acetate copolymers (EVA), ethylene-vinyl acetate-carbon monoxide copolymers (EVACO), vinyl chloride-based thermoplastic elastomers such as vinyl chloride-vinyl acetate copolymers and vinyl chloride-vinylidene chloride copolymers, styrene-based thermoplastic elastomers, olefine-based thermoplastic elastomers, urethane-based thermoplastic elastomers, polyester-based thermoplastic elastomers, and polyamide-based thermoplastic elastomers. These thermoplastic elastomers may be used singly or in combinations of two or more.

The resin composition for molding of the present invention is preferably free from a β-diketone. A β-diketone is a component contained in conventional thermal stabilizers to improve thermal stability. When, however, a thermal stabilizer containing a β-diketone is used, the external appearance of a molded body tends to be impaired in the production of the molded body by molding a resin composition by extrusion molding or injection molding. For example, streaks of a yellow to reddish brown color with a thickness of approximately 0.1 to 1 mm may be formed on the surface of the molded body, in parallel with the direction of flow of the resin. A molded body having such an impaired external appearance is a defective product. In particular, the use of a die that has been used for long hours tends to produce such a defective product. In accordance with the present invention, however, a resin composition for molding having excellent thermal stability can be provided without using a thermal stabilizer containing a β-diketone.

The resin composition for molding of the present invention may be produced using, for example, a method including the steps of preparing a chlorinated polyvinyl chloride by preparing in a reaction vessel a suspension in which a polyvinyl chloride is suspended in an aqueous medium, introducing chlorine into the reaction vessel, and chlorinating the polyvinyl chloride using any of conventionally known methods; and adding a thermal stabilizer to the chlorinated polyvinyl chloride, followed by mixing.

In the step of preparing the chlorinated polyvinyl chloride, the reaction vessel used may be a commonly used vessel such as a glass-lined stainless steel reaction vessel or titanium reaction vessel, for example.

The method of preparing the suspension in which the polyvinyl chloride is suspended in an aqueous medium is not particularly limited. For example, a cake-like PVC obtained by subjecting a polymerized PVC to monomer removal treatment may be used, a dried PVC may be resuspended in an aqueous medium, or a suspension obtained by removing any substances undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not particularly limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10 mass % of chlorine from a cylinder.

While the gauge pressure in the reaction vessel is not particularly limited, it is preferably from 0.3 to 2 MPa, because the higher is the chlorine pressure, the more readily the chlorine will penetrate into the PVC particles.

The method of chlorinating the PVC in the suspended state is not particularly limited. Examples of chlorination methods include a method in which the excitation of bonding of the PVC and chlorine is brought about by thermal energy to accelerate the chlorination (hereinafter referred to as heat chlorination); and a method in which light energy such as an ultraviolet ray is irradiated to accelerate the chlorination by photoreaction (hereinafter referred to as photo-chlorination). The method of heating in the chlorination by thermal energy is not particularly limited, and for example, heating with an external jacket from the reactor walls is effective. When light energy such as an ultraviolet ray is used, an apparatus capable of light energy irradiation such as ultraviolet irradiation under high temperature and high pressure conditions is required. In the case of photo-chlorination, the chlorination reaction temperature is preferably 40° C. to 80° C.

Among the above-described chlorination methods, a heat chlorination method involving no ultraviolet irradiation is preferred, and a method in which the excitation of bonding of the polyvinyl chloride and chlorine is brought about by heat alone or by heat and hydrogen peroxide to accelerate the chlorination reaction is preferred. In the case of the chlorination reaction by light energy, the amount of light energy needed to chlorinate the PVC is greatly affected by the distance between the PVC and the light source. Thus, the amount of received energy is different inside and on the surface of the PVC particles, such that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

In the case of the above-described chlorination by heat alone, the temperature is preferably 70° C. to 140° C. When the temperature is excessively low, the rate of chlorination will decrease. When the temperature is excessively high, dehydrochlorination reaction will occur along with the chlorination reaction, which causes coloration of the resulting CPVC. The heating temperature is more preferably 100° C. to 135° C. The heating method is not particularly limited, and heating may be performed with an external jacket from the reaction vessel walls, for example.

In the chlorination, hydrogen peroxide is preferably further added to the suspension. The addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease. When hydrogen peroxide is added as described above, the rate of chlorination is improved, such that the heating temperature can be set relatively low. The heating temperature may be 65° C. to 110° C., for example.

During the chlorination, it is preferred to perform chlorination at a chlorine consumption rate of 0.010 to 0.015 kg/PVC-Kg·5 min after the chlorine content reaches a value that is five percentage points by weight lower than the final chlorine content, and further perform chlorination at a chlorine consumption rate of 0.005 to 0.010 kg/PVC-Kg·5 min after the chlorine content reaches a value that is three percentage points by weight lower than the final chlorine content. As used herein, the term "chlorine consumption rate" refers to the amount of chlorine consumed in 5 minutes per kilogram of the raw material PVC.

When chlorination is performed using the above-described method, a CPVC having less nonuniformity in the chlorinated state and having excellent thermal stability can be obtained.

The method of producing the resin composition for molding of the present invention includes the subsequent step of adding a thermal stabilizer and optionally an antioxidant to the chlorinated polyvinyl chloride, followed by mixing.

The method of mixing the thermal stabilizer and antioxidant is not particularly limited, and may be a method using hot blending or cold blending, for example.

In accordance with the constitution of the invention of the present application described above, a resin composition for molding having excellent thermal stability and free of heavy metals such as lead, cadmium, and tin can be provided.

Further, in accordance with another aspect of the present invention, a molded body molded from the resin composition for molding of the present invention is provided. Such a molded body is also encompassed by the present invention.

As the method of molding, any of conventionally known molding methods may be employed, for example, extrusion molding or injection molding.

The molded body of the present invention is heavy metal-free, as with the resin composition for molding of the present invention, and thus, has the advantage of having no adverse effects on the environment, has excellent thermal stability, and has a satisfactory external appearance. The molded body of the present invention can therefore be suitably used in applications such as building components, pipes and engineering plastics, and housing materials.

Advantageous Effects of Invention

In accordance with the present invention, a resin composition for molding can be provided which allows production of a molded body having excellent thermal stability, as well as high flexibility and strength, without using heavy metals such as lead and tin, and a molded body obtained using the resin composition for molding can also be provided.

DESCRIPTION OF EMBODIMENTS

The present invention will be hereinafter described in more detail with reference to examples; however, the invention should not be construed as being limited to these examples.

Example 1

(Preparation of Chlorinated Polyvinyl Chloride)

A glass-lined reaction vessel with an internal volume of 300 L was charged with 200 kg of ion-exchange water and 56 kg of a polyvinyl chloride with an average degree of polymerization of 1000. The mixture was stirred, and water was further added to the reaction vessel to disperse the mixture in the water. The pressure was subsequently reduced to remove oxygen from the reaction vessel, and the temperature was simultaneously elevated to 90° C.

Chlorine was then supplied into the reaction vessel so that the chlorine partial pressure would be 0.4 MPa, and the chlorination reaction was performed while adding 0.2 mass % hydrogen peroxide at a rate of 1 part by mass per hour (320 ppm/hour). The reaction was continued until the chlorine content in the chlorinated polyvinyl chloride reached 61 mass %. When the chlorine content in the chlorinated polyvinyl chloride reached 61 mass % (five percentage points by weight lower than the final chlorine content), the amount of 0.2 mass % hydrogen peroxide added was reduced to 0.1 parts by mass per hour (200 ppm/hour), and the average chlorine consumption rate was adjusted to 0.012 kg/PVC-kg·5 min, and then the chlorination was allowed to proceed. Further, when the chlorine content reached 63 mass % (three percentage points by weight lower than the final chlorine content), the amount of 0.2 mass % hydrogen peroxide added was reduced to 150 ppm/hour, and the average chlorine consumption rate was adjusted to 0.008 kg/PVC-kg·5 min, and then the chlorination was allowed to proceed. In this way, a chlorinated polyvinyl chloride having a chlorine content of 65.6 mass % was obtained.

(Preparation of Chlorinated Polyvinyl Chloride Composition)

To 100 parts by mass of the obtained chlorinated polyvinyl chloride were added 3.0 parts by mass of a thermal stabilizer and 0.5 parts by mass of pentaerythrityl-tetrakis [3-(3,5-di-t-butyl-4-hydroxyphenyl)propionate] (hindered phenolic antioxidant; Irganox 1010; BASF Corporation; loss in quantity on heating at 200° C.: 1.0 mass %) as an antioxidant, and mixed together. As the thermal stabilizer, 2.0 parts by mass of calcium stearate and 1.0 part by mass of zinc stearate were used.

Additionally, 5.0 parts by mass of a MBS (methacrylate-butadiene-styrene) resin (Kaneka Corporation; Kane Ace M-511) as an impact modifier, 2.0 parts by mass of a polyethylene-based lubricant (Mitsui Chemicals, Inc.; Hiwax 220MP), 0.3 parts by mass of a fatty acid ester-based lubricant (Emery Oleochemicals Japan Ltd.; LOXIOL G-32), and 5.0 parts by weight of titanium dioxide (Ishihara Sangyo Kaisha, Ltd.; TIPAQUE CR-90) were added and uniformly mixed in a super mixer to obtain a chlorinated polyvinyl chloride composition.

(Preparation of Extrudate)

The obtained chlorinated polyvinyl chloride composition was fed into a twin-screw counter-rotating conical extruder with a diameter of 50 mm (Osada Seisakusho; "SLM-50") to prepare a pipe-shaped molded body with an internal diameter of 20 mm and a thickness of 3 mm at a resin temperature of 205° C.

Example 2

A chlorinated polyvinyl chloride composition and an extrudate were prepared as in Example 1, except that the proportions in the molecular structure of the chlorinated polyvinyl chloride were changed as shown in Table 1.

Examples 3 to 6

Chlorinated polyvinyl chlorides, chlorinated polyvinyl chloride compositions, and extrudates were prepared as in Example 1, except that the amount of the thermal stabilizer, the proportions in the molecular structure of each of the chlorinated polyvinyl chlorides, and the amounts of other additives were changed as shown in Table 1.

Example 7

A chlorinated polyvinyl chloride, a chlorinated polyvinyl chloride composition, and an extrudate were prepared as in Example 1, except that the amount of the thermal stabilizer was changed as shown in Table 1, and 0.5 part by mass of a β-diketone (dibenzoylmethane; Wako Pure Chemical Industries, Ltd.) was added.

Example 8

A chlorinated polyvinyl chloride, a chlorinated polyvinyl chloride composition, and an extrudate were prepared as in Example 1, except that 2.0 parts by mass of calcium laurate and 2.0 parts by mass of zinc stearate were used as the thermal stabilizer.

Example 9

A chlorinated polyvinyl chloride, a chlorinated polyvinyl chloride composition, and an extrudate were prepared as in Example 1, except that 2.0 parts by mass of calcium montanate and 2.0 parts by mass of zinc stearate were used as the thermal stabilizer.

Example 10

A chlorinated polyvinyl chloride, a chlorinated polyvinyl chloride composition, and an extrudate were prepared as in Example 1, except that 2.0 parts by mass of calcium stearate and 2.0 parts by mass of zinc laurate were used as the thermal stabilizer.

Example 11

A chlorinated polyvinyl chloride and a chlorinated polyvinyl chloride composition were prepared as in Example 1, except that a polyvinyl chloride with an average degree of polymerization of 700 was used, 2.0 parts by mass of calcium stearate and 2.0 parts by mass of zinc stearate were used as the thermal stabilizer, and 0.5 parts by mass of pentaerythrityl-tetrakis[3-(3,5-di-t-butyl-4-hydroxyphenyl) propionate] (hindered phenolic antioxidant; Irganox 1010; BASF Corporation) was used as the antioxidant.

(Preparation of Injection Molded Body)

The obtained chlorinated polyvinyl chloride composition was fed into a twin-screw counter-rotating conical extruder with a diameter of 30 mm (Osada Seisakusho; "OSC-30") to prepare a pellet at a resin temperature of 190° C.

The obtained pellet was fed into an injection molding machine ("J100E-05"; Nisshin Steel Co., Ltd.), and a socket-shaped injection molded body with a nominal diameter of 25 mm was prepared at a resin temperature of 230° C. when purged from the nozzle.

Example 12

A chlorinated polyvinyl chloride, a chlorinated polyvinyl chloride composition, and an injection molded body were prepared as in Example 11, except that 2.0 parts by mass of calcium montanate and 2.0 parts by mass of zinc laurate were used as the thermal stabilizer.

Comparative Examples 1, 2, 4 and 5

Chlorinated polyvinyl chlorides, chlorinated polyvinyl chloride compositions, and extrudates were prepared as in Example 1, except that the proportions in the molecular structure of each of the chlorinated polyvinyl chlorides were changed as shown in Table 2, and the other additives were changed as shown in Table 2.

Comparative Example 3

A chlorinated polyvinyl chloride, a chlorinated polyvinyl chloride composition, and an extrudate were prepared as in Example 1, except that the chlorinated polyvinyl chloride obtained in Example 1 was used, and the other additives were changed as shown in Table 2.

Comparative Example 6

A chlorinated polyvinyl chloride, a chlorinated polyvinyl chloride composition, and an injection molded body were prepared as in Example 11, except that a polyvinyl chloride with an average degree of polymerization of 700 was used, and the other additives were changed as shown in Table 2. In this comparative example, hydrotalcite (Alcamizer 1; Kyowa Chemical Industry Co., Ltd.) was used.

<Evaluation>

The chlorinated polyvinyl chlorides, the chlorinated polyvinyl chloride compositions, and the molded bodies obtained in the examples and comparative examples were evaluated as follows. The results are shown in Tables 1 and 2.

[Evaluation of Chlorinated Polyvinyl Chlorides]

<Measurement of Chlorine Content>

The chorine content was measured in accordance with JIS K 7229.

<Molecular Structure Analysis>

Measurements were performed in accordance with the NMR measurement method described in R. A. Komoroski, R. G. Parker, J. P. Shocker, Macromolecules, 1985, 18, 1257-1265. NMR measurements were performed under the following conditions:

Apparatus: FT-NMR (JEOL; JNM-AL-300)
Measured nuclei: 13C (proton complete decoupling)
Pulse width: 90°
PD: 2.4 sec
Solvent: o-dichlorobenzene:deuterated benzene (C5D5)=3:1
Sample concentration: about 20%
Temperature: 110° C.
Reference material: central signal for benzene set to 128 ppm
Number of scans: 20000

<Measurement of UV Absorbance (216 nm)>

UV absorbance at a wavelength of 216 nm was measured under the following measurement conditions.

For Comparative Examples 2 and 5, a concentration of 20 mg sample/25 ml THF exceeded the measurement range of the evaluation equipment. Thus, the concentration was adjusted to 10 mg sample/25 ml THF, and measurements were performed again.

Apparatus: automatic recording spectrophotometer (Hitachi, Ltd.; U-3500)
Solvent: THF
Concentration: 20 mg sample/25 ml THF . . . 800 ppm (Examples 1 and 4 to 12 and Comparative Examples 1, 3, 4 and 6)
Concentration: 10 mg sample/25 ml THF . . . 800 ppm (Examples 2 and 3 and Comparative Examples 2 and 5)

<Dehydrochlorination Time>

One gram of each of the obtained chlorinated polyvinyl chlorides was placed in a test tube and heated at 190° C. in an oil bath. The produced HCl gas was then collected and dissolved in 100 ml of ion-exchange water, and the pH was measured. The number of grams of HCl produced per million grams of the chlorinated polyvinyl chloride was calculated from the pH value, and the time required for this value to reach 7000 ppm was measured.

[Evaluation of Chlorinated Polyvinyl Chloride Compositions]

<Static Thermal Stability>

Each of the obtained chlorinated polyvinyl chloride compositions was fed into two 8-inch rolls, and kneaded at 205° C. for 3 minutes to prepare a 1.0-mm-thick sheet. The obtained sheet was heated in a gear oven at 200° C., and the time (min) required for the sheet to foam or turn black was measured.

<Dynamic Thermal Stability>

Each of the obtained chlorinated polyvinyl chloride compositions was fed into the plastomill ("Labo Plastomill"; Toyo Seiki Seisaku-Sho, Ltd.), and kneaded at a rotation speed of 50 rpm, 195° C., and a fill volume of 63 g, and the gelling time (sec) was measured. The gelling time was measured as the time it took from the start of kneading until the kneading torque reached a peak. After gelling, kneading and heating were further continued, and the decomposition time (min) of the chlorinated polyvinyl chloride was measured. The decomposition time was measured as the time it took from the start of kneading until the kneading torque, which had stabilized after gelling, started to increase again.

<Mechanical Properties (Tensile Strength, Tensile Modulus of Elasticity, and Thermal Deformation Temperature)>

Each of the obtained chlorinated polyvinyl chloride compositions was fed into two 8-inch rolls, and kneaded at 205° C. for 3 minutes to prepare a 1.0-mm-thick sheet. The obtained sheet was layered, preheated with a press at 205° C. for 3 minutes, and then pressurized for 4 minutes to obtain a 3-mm-thick press plate. The obtained press plate was cut into specimens by machining. Tensile strength and tensile modulus of elasticity were measured for these specimens in accordance with ASTM D638. Thermal deformation temperature was measured under a load of 186 N/cm$^2$ in accordance with ASTM D648. Note that the thermal deformation temperature was measured after annealing the obtained press plate in a gear oven at 90° C. for 24 hours.

<Loss in Quantity on Heating>

The loss in quantity on heating of each of the obtained chlorinated polyvinyl chloride compositions was measured using a thermogravimetric measurement (TG) apparatus (Seiko Instruments Inc.; TG/DTA6200). The measurement was performed under the conditions of a heating rate of 5° C./minute and temperatures of 30° C. to 300° C.

The loss in quantity on heating at 230° C. was determined based on the measurement results, by substituting the values into the following equation:

loss in quantity on heating (mass %)=(mass prior to measurement−mass at 230° C.)/(mass prior to measurement)×100

[Evaluation of Molded Bodies]

<Observation of External Appearance>

The surface condition of each of the obtained pipe-shaped extrudates was visually observed, and evaluated for the presence or absence of bubbles (foaming), streaks (longitudinal lines extending in the extrusion direction), and scorching (discoloration). Each of the socket-shaped injection molded bodies similarly obtained was also evaluated for the presence or absence of bubbles (foaming), silver streaks, and scorching (discoloration).

TABLE 1

|  |  | Example 1 | Example 2 | Example 3 | Example 4 | Example 5 | Example 6 |
|---|---|---|---|---|---|---|---|
| Composition (parts by mass) | Chlorinated polyvinyl chloride (degree of polymerization: 1000) | 100 | 100 | 100 | 100 | 100 | 100 |
|  | Chlorinated polyvinyl chloride (degree of polymerization: 700) | — | — | — | — | — | — |
|  | Claicum pentanoate | — | — | — | — | — | — |
|  | Clacium laurate | — | — | — | — | — | — |
|  | Calcium stearate | 2.0 | 2.0 | 2.0 | 3.5 | 0.4 | 4.5 |
|  | Calcium montanate | — | — | — | — | — | — |
|  | Zinc stearate | 1.0 | 1.0 | 1.0 | 1.0 | 0.4 | 4.0 |
|  | Zinc laurate | — | — | — | — | — | — |
|  | β-diketone | — | — | — | — | — | — |
|  | Hydrotalcite | — | — | — | — | — | — |
|  | Hindered phenolic antioxidant | 0.5 | 0.5 | — | 0.5 | 0.5 | 0.5 |
|  | methyl methacrylate-butadiene-styrene resin | 5.0 | 5.0 | 5.0 | 5.0 | 5.0 | 5.0 |
|  | Polyethylene-based lubricant | 2.0 | 2.0 | 2.0 | 2.0 | 2.0 | 2.0 |
|  | Fatty acid ester-based lubricant | 0.3 | 0.3 | 0.3 | 0.3 | 0.3 | 0.3 |
|  | Titanium dioxide | 5.0 | 5.0 | 5.0 | 5.0 | 5.0 | 5.0 |
| Evaluation (chlorinated polyvinyl chloride) | Chlorine content (mass %) | 65.6 | 70.6 | 70.6 | 65.6 | 65.6 | 65.6 |
|  | Molecular structure (mol %) —$CCl_2$— | 5.7 | 16.9 | 16.9 | 5.7 | 5.7 | 5.7 |
|  | —CHCl— | 60.1 | 55.1 | 55.1 | 60.1 | 60.1 | 60.1 |
|  | —$CH_2$— | 34.2 | 28.0 | 28.0 | 34.2 | 34.2 | 34.2 |
|  | Sequence of four or more VC units | 26.4 | 15.9 | 15.9 | 26.4 | 26.4 | 26.4 |
|  | UV absorbance [216 nm] | 0.7 | 5.3 | 5.3 | 0.7 | 0.7 | 0.7 |
|  | Dehydrochlorination time (sec) | 90 | 148 | 148 | 90 | 90 | 90 |
| Evaluation (chlorinated polyvinyl chloride composition) | Thermal stability — Static thermal stability (min) | 100 | 70 | 40 | 100 | 70 | 120 |
|  | Dynamic thermal stability [Gelling time (sec)] | 102 | 83 | 80 | 95 | 78 | 110 |
|  | Dynamic thermal stability [decomposition time (min)] | 18 | 11 | 11 | 17 | 10 | 22 |
|  | Loss in quantity on heating (%) | 0.9 | 0.9 | 0.9 | 0.9 | 0.8 | 1.2 |
|  | Mechanical properties — Tensile strength (MPa) | 55.5 | 62.6 | 62.3 | 55.5 | 55.9 | 53.3 |
|  | Tensile modulus of elasticity (MPa) | 3050 | 3210 | 3200 | 2730 | 2950 | 2590 |
|  | Thermal deformation temperature (° C.) | 109 | 123 | 123 | 108 | 110 | 107 |
| Evaluation (molded body) | Extrusion molding — Foaming | Absent | Absent | Absent | Absent | Absent | Absent |
|  | Streaks | Absent | Absent | Absent | Absent | Absent | Absent |
|  | Scorching | Absent | Absent | Absent | Absent | Absent | Absent |
|  | Injection molding — Foaming | — | — | — | — | — | — |
|  | Silver streaks | — | — | — | — | — | — |
|  | Scorching | — | — | — | — | — | — |

|  |  | Example 7 | Example 8 | Example 9 | Example 10 | Example 11 | Example 12 |
|---|---|---|---|---|---|---|---|
| Composition (parts by mass) | Chlorinated polyvinyl chloride (degree of polymerization: 1000) | 100 | 100 | 100 | 100 | — | — |
|  | Chlorinated polyvinyl chloride (degree of polymerization: 700) | — | — | — | — | 100 | 100 |
|  | Claicum pentanoate | — | — | — | — | — | — |
|  | Clacium laurate | — | 2.0 | — | — | — | — |
|  | Calcium stearate | 3.0 | — | — | 2.0 | 2.0 | — |
|  | Calcium montanate | — | — | 2.0 | — | — | 2.0 |
|  | Zinc stearate | 2.0 | 2.0 | 2.0 | — | 2.0 | — |
|  | Zinc laurate | — | — | — | 2.0 | — | 2.0 |
|  | β-diketone | 0.5 | — | — | — | — | — |
|  | Hydrotalcite | — | — | — | — | — | — |
|  | Hindered phenolic antioxidant | 0.5 | 0.5 | 0.5 | 0.5 | 0.5 | 0.5 |
|  | methyl methacrylate-butadiene-styrene resin | 5.0 | 5.0 | 5.0 | 5.0 | 5.0 | 5.0 |
|  | Polyethylene-based lubricant | 2.0 | 2.0 | 2.0 | 2.0 | 2.0 | 2.0 |
|  | Fatty acid ester-based lubricant | 0.3 | 0.3 | 0.3 | 0.3 | 0.3 | 0.3 |
|  | Titanium dioxide | 5.0 | 5.0 | 5.0 | 5.0 | 5.0 | 5.0 |
| Evaluation (chlorinated polyvinyl chloride) | Chlorine content (mass %) | 65.6 | 65.6 | 65.6 | 65.6 | 66.1 | 66.1 |
|  | Molecular structure (mol %) —$CCl_2$— | 5.7 | 5.7 | 5.7 | 5.7 | 5.8 | 5.8 |
|  | —CHCl— | 60.1 | 60.1 | 60.1 | 60.1 | 60.3 | 60.3 |
|  | —$CH_2$— | 34.2 | 34.2 | 34.2 | 34.2 | 33.9 | 33.9 |
|  | Sequence of four or more VC units | 26.4 | 26.4 | 26.4 | 26.4 | 25.9 | 25.9 |
|  | UV absorbance [216 nm] | 0.7 | 0.7 | 0.7 | 0.7 | 0.6 | 0.6 |
|  | Dehydrochlorination time (sec) | 90 | 90 | 90 | 90 | 87 | 87 |
| Evaluation (chlorinated polyvinyl chloride composition) | Thermal stability — Static thermal stability (min) | 90 | 110 | 110 | 100 | 100 | 100 |
|  | Dynamic thermal stability [Gelling time (sec)] | 89 | 98 | 110 | 95 | 95 | 100 |
|  | Dynamic thermal stability [decomposition time (min)] | 18 | 19 | 18 | 18 | 18 | 19 |
|  | Loss in quantity on heating (%) | 1.0 | 1.3 | 0.7 | 1.3 | 0.9 | 1.0 |
|  | Mechanical properties — Tensile strength (MPa) | 54.4 | 54.3 | 53.8 | 54.0 | 54.1 | 53.8 |
|  | Tensile modulus of elasticity (MPa) | 2710 | 2940 | 2920 | 3010 | 2990 | 2950 |
|  | Thermal deformation temperature (° C.) | 108 | 108 | 108 | 108 | 108 | 108 |
| Evaluation (molded body) | Extrusion molding — Foaming | Absent | Absent | Absent | Absent | — | — |
|  | Streaks | Present | Absent | Absent | Absent | — | — |
|  | Scorching | Absent | Absent | Absent | Absent | — | — |
|  | Injection molding — Foaming | — | — | — | — | Absent | Absent |
|  | Silver streaks | — | — | — | — | Absent | Absent |
|  | Scorching | — | — | — | — | Absent | Absent |

TABLE 2

|  |  | Comparative Example | | | | | |
|---|---|---|---|---|---|---|---|
|  |  | 1 | 2 | 3 | 4 | 5 | 6 |
| Composition (parts by mass) | Chlorinated polyvinyl chloride (degree of polymerization: 1000) | 100 | 100 | 100 | 100 | 100 | — |
|  | Chlorinated polyvinyl chloride (degree of polymerization: 700) | — | — | — | — | — | 100 |
|  | Claicum pentanoate | — | — | — | — | — | 2.0 |
|  | Clacium laurate | — | — | — | — | — | — |
|  | Calcium stearate | 2.0 | 2.0 | 3.0 | 2.0 | 2.0 | — |
|  | Calcium montanate | — | — | — | — | — | — |
|  | Zinc stearate | 1.0 | 1.0 | — | 1.0 | 1.0 | 1.0 |
|  | Zinc laurate | — | — | — | — | — | — |
|  | β-diketone | — | — | — | — | — | — |
|  | Hydrotalcite | — | — | — | — | — | 2.0 |
|  | Hindered phenolic antioxidant | 0.5 | 0.5 | 0.5 | 0.5 | 0.5 | 0.5 |
|  | methyl methacrylate-butadiene-styrene resin | 5.0 | 5.0 | 5.0 | 5.0 | 5.0 | 5.0 |
|  | Polyethylene-based lubricant | 2.0 | 2.0 | 2.0 | 2.0 | 2.0 | 2.0 |
|  | Fatty acid ester-based lubricant | 0.3 | 0.3 | 0.3 | 0.3 | 0.3 | 0.3 |
|  | Titanium dioxide | 5.0 | 5.0 | 5.0 | 5.0 | 5.0 | 5.0 |
| Evaluation (Chlorinated polyvinyl chloride) | Chlorine content (mass %) | 61.9 | 73.4 | 65.6 | 65.6 | 70.6 | 66.1 |
|  | Molecular structure (mol %) —CCl$_2$— | 4.7 | 19.7 | 5.7 | 5.6 | 18.1 | 5.8 |
|  | —CHCl— | 51.9 | 61.5 | 60.1 | 57.1 | 52.7 | 60.3 |
|  | —CH$_2$— | 43.4 | 18.8 | 34.2 | 37.4 | 29.2 | 33.9 |
|  | Sequence of four or more VC units | 35.2 | 11.4 | 26.4 | 33.7 | 16.8 | 25.9 |
|  | UV absorbance [216 nm] | 0.9 | 8.9 | 0.7 | 1.3 | 8.2 | 0.6 |
|  | Dehydrochlorination time (sec) | 53 | 65 | 90 | 52 | 96 | 87 |
| Evaluation (Chlorinated polyvinyl chloride composition) | Thermal stability Static thermal stability (min) | 80 | 35 | 30 | 45 | 45 | 90 |
|  | Dynamic thermal stability[Gelling time (sec)] | 76 | 94 | 80 | 94 | 97 | 92 |
|  | Dynamic thermal stability [decomposition time (min)] | 13 | 6 | 12 | 12 | 13 | 15 |
|  | Loss in quantity on heating (%) | 0.9 | 0.9 | 0.9 | 0.9 | 0.9 | 2.6 |
|  | Mechanical properties Tensile strength (MPa) | 50.8 | 65.2 | 52.3 | 54.6 | 61.0 | 53.1 |
|  | Tensile modulus of elasticity (MPa) | 2820 | 3540 | 2880 | 2760 | 3230 | 2880 |
|  | Thermal deformation temperature (° C.) | 95 | 132 | 109 | 109 | 121 | 107 |
| Evaluation (Molded body) | Extrusion molding Foaming | Absent | Present | Absent | Absent | Absent | — |
|  | Streaks | Absent | Absent | Absent | Absent | Absent | — |
|  | Scorching | Absent | Present | Present | Present | Present | — |
|  | Injection molding Foaming | — | — | — | — | — | Present |
|  | Silver streaks | — | — | — | — | — | Present |
|  | Scorching | — | — | — | — | — | Absent |

INDUSTRIAL APPLICABILITY

In accordance with the present invention, a resin composition for molding can be provided which allows production of a molded body having excellent thermal stability, as well as high flexibility and strength, without using heavy metals such as lead and tin, and a molded body obtained using the resin composition for molding can also be provided.

The invention claimed is:

1. A resin composition for molding, comprising:
a chlorinated polyvinyl chloride, a thermal stabilizer, and an antioxidant,
the chlorinated polyvinyl chloride having structural units (a) to (c) of the following formulae (a) to (c):

—CCl$_2$— (a),

—CHCl— (b),

—CH$_2$— (c), the proportion of the structural unit (a) being 17.5 mol % or less, the proportion of the structural unit (b) being 46.0 mol % or more, and the proportion of the structural unit (c) being 37.0 mol % or less, relative to the total number of moles of the structural units (a), (b), and (c),
the chlorinated polyvinyl chloride having a chlorine content of 63 mass % or more and less than 72 mass %,
the thermal stabilizer containing a calcium alkyl carboxylate and a zinc compound,
an amount of the antioxidant being from 0.1 to 3 parts by mass based on 100 parts by mass of the chlorinated polyvinyl chloride, and
the resin composition for molding having a loss in quantity on heating at 230° C. of less than 2 mass %.

2. The resin composition for molding according to claim 1,
wherein in the chlorinated polyvinyl chloride, the proportion of the structural unit (b) is 58.0 mol % or more, and the proportion of the structural unit (c) is 35.8 mol % or less, relative to the total number of moles of the structural units (a), (b), and (c).

3. The resin composition for molding according to claim 1,
wherein the chlorinated polyvinyl chloride has a UV absorbance at a wavelength of 216 nm of 0.8 or less.

4. The resin composition for molding according to claim 1,
wherein in the chlorinated polyvinyl chloride, time required for the amount of dehydrochlorination at 190° C. to reach 7000 ppm is 60 seconds or longer.

5. The resin composition for molding according to claim 1,
wherein the chlorinated polyvinyl chloride has a chlorine content of 63 mass % or more and less than 69 mass %.

6. The resin composition for molding according to claim 1,
wherein the chlorinated polyvinyl chloride has a UV absorbance at a wavelength of 216 nm of 8.0 or less.

7. The resin composition for molding according to claim 1,
wherein in the chlorinated polyvinyl chloride, time required for the amount of dehydrochlorination at 190° C. to reach 7000 ppm is 100 seconds or longer.

8. The resin composition for molding according to claim 1,
wherein the chlorinated polyvinyl chloride has a chlorine content of 69 mass % or more and 72 mass % or less.

9. The resin composition for molding according to claim 1,
wherein the antioxidant contains a hindered phenolic antioxidant, and has a loss in quantity on heating at 200° C. of less than 5 mass %.

10. The resin composition for molding according to claim 1, which is free from a β-diketone.

11. The resin composition for molding according to claim 1, which comprises 0.4 to 10 parts by mass of the thermal stabilizer based on 100 parts by mass of the chlorinated polyvinyl chloride.

12. A molded body molded from the resin composition for molding according to claim 1.

* * * * *